Aug. 2, 1966  A. P. S. HYDE  3,263,660
PRESSURE REGULATOR

Filed June 17, 1964  2 Sheets-Sheet 1

INVENTOR.
Arthur P. S. Hyde
BY J. L. Carpenter
ATTORNEY

Aug. 2, 1966 A. P. S. HYDE 3,263,660
PRESSURE REGULATOR
Filed June 17, 1964 2 Sheets-Sheet 2

INVENTOR.
Arthur P.S. Hyde
BY
J. L. Carpenter
ATTORNEY

United States Patent Office 3,263,660
Patented August 2, 1966

3,263,660
PRESSURE REGULATOR
Arthur P. S. Hyde, Rochester, Mich., assignor to General Motors Corporation, Detroit, Mich., a corporation of Delaware
Filed June 17, 1964, Ser. No. 375,858
17 Claims. (Cl. 123—119)

This invention relates to pressure regulators and, more particularly, to a pressure regulator adapted to be connected between the crankcase and the inlet manifold of an internal combustion engine to regulate the flow of crankcase vapors into the inlet manifold so as to maintain a relatively constant crankcase pressure.

The ventilation of internal combustion engine crankcases by the drawing of crankcase vapors into the engine inlet manifold is well known in the art. Generally in systems of this type, means are provided to admit fresh air to the engine crankcase to scavenge the crankcase vapors therefrom. In addition, it is usual to provide some means of regulating the flow of the mixture of crankcase vapors and fresh air from the crankcase to the inlet manifold. One such flow regulating means is disclosed in McMullen Patent No. 2,716,398 assigned to the assignee of the present invention. This invention relates, however, to a different form of regulating means which may take the form of a diaphragm actuated pressure regulator connected to sense crankcase pressure and effective to regulate the flow of vapors therefrom so as to limit the crankcase pressure to a predetermined desired value.

In the usual case, the diaphragm actuated pressure regulator is arranged to maintain a depression, or less than atmospheric pressure, in the crankcase. Such a regulator is commonly referred to as a crankcase depression regulator. When such a crankcase depression regulator is utilized, the crankcase fresh air inlet is commonly provided with an orifice or other means of controlling the rate of fresh air inflow to the crankcase in order to provide for obtaining the desired crankcase depression without excessive flow of gases through the engine crankcase.

In the past crankcase depression regulators have generally been constructed with a control arrangement having a diaphragm actuated sleeve or piston reciprocating in a cylinder to obtain the regulation desired. Valves of this construction have been found to be subject to sticking and jamming due to sludge and other deposits formed by the passage of crankcase vapors through the valves.

Certain other crankcase depression regulators of the diaphragm type have been constructed avoiding the sliding plunger or sliding sleeve construction so as not to be subject to the aforementioned problem of sticking, but all such arrangements known in the prior art are subject to the effects of varying inlet manifold vacuum as a factor in the regulation of the crankcase depression. Consequently, in these arrangements, the regulated crankcase depression is subject to variation in response to variation of the inlet manifold vacuum.

Additionally, crankcase depression regulators have not, as a rule, included means for preventing the reverse flow of gases from the intake manifold to the crankcase, which is likely to occur in case of a backfire and which could result in a dangerous crankcase explosion or fire.

Furthermore, it has been found that engines equipped with crankcase depression regulators are difficult to start when cold, since, under starting conditions, the regulator valve is generally in the fully open position allowing an excessive passage of crankcase vapors into the inlet manifold, and thereby upsetting the proper operation of the choke mechanism needed for satisfactory cold engine starting.

A feature of this invention is that it provides a pressure regulator having valve means closing by contact with a valve seat, eliminating sliding contact elements and the accompanying valve sticking problems, said valve means being substantially unaffected by fluid pressures on one side of the valve means and actuated by means responsive to pressures on the other side of the valve means.

Another feature of this invention is that it provides a crankcase depression regulator of the diaphragm type having valve means of the contact closing type, eliminating sliding contact elements and the accompanying valve sticking problems, and including balance chamber means for balancing out the effect of inlet manifold vacuum as a factor in the control of crankcase depression.

A further feature of this invention is that the balance chamber arrangement may be dimensioned so as to provide for the inclusion of some effect of inlet manifold depression on the control of crankcase depression, if desired, and this effect can be either in a positive or negative direction.

Yet another feature of this invention is that means are included to substantially prevent the reverse flow of gases from the inlet manifold to the engine crankcase, thereby preventing a possible crankcase explosion due to an engine backfire.

Still another feature is that temperature responsive bimetallic spring means are included which are operative to close the regulating valve when the engine is cold to prevent the passage of crankcase vapors into the inlet manifold during cold starting conditions.

An alternative feature of the invention is that temperature responsive bimetallic spring means may be provided which are operative to close the backfire preventing means with substantially the same results of preventing the flow of crankcase vapors into the inlet manifold during cold engine starting.

Other novel features of the invention will be apparent from the following specification and drawings in which.

Figures 1, 2:
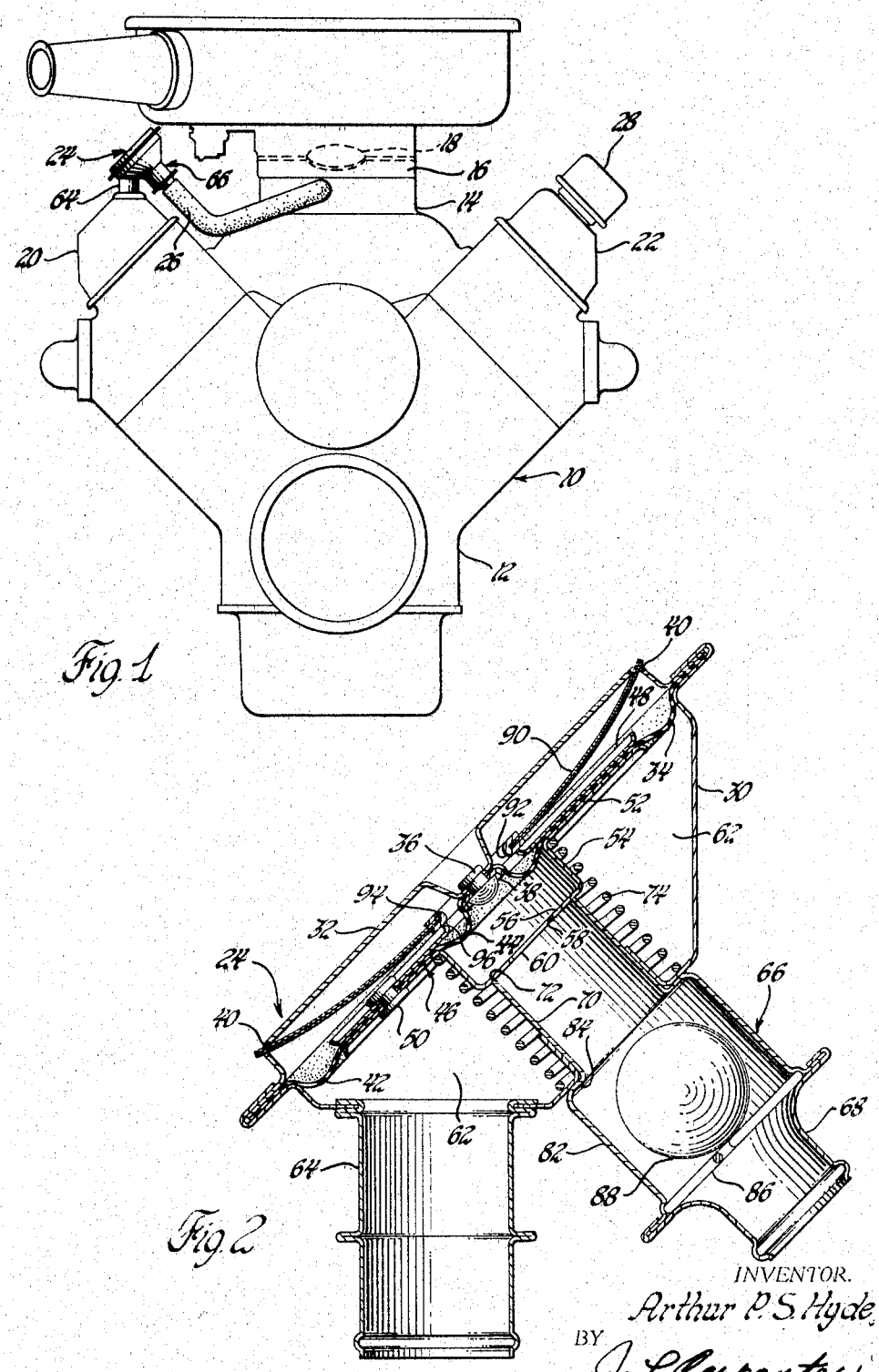
FIGURE 1 is an end elevational view of an internal combustion engine embodying the invention.
FIGURE 2 is a cross-sectional view of a crankcase depression regulator according to the invention.

Referring now to the drawings, an engine 10 includes a crankcase 12 and a system for inducting combustible mixtures including an inlet manifold 14 downstream of the usual carburetor 16 having a throttle valve 18. Rocker covers 20 and 22 partially form compartments in communication with the crankcase 12. A crankcase depression regulator generally indicated by numeral 24 is mounted on rocker cover 20 and is connected by a conduit 26 to the inlet manifold 14 thus providing a flow path for crankcase vapors through rocker cover 20, regulator 24 and conduit 26 to the inlet manifold 14. A breather cap 28 having an orifice or other air flow restriction therein may be mounted on rocker cover 22 to provide for the admission of fresh air to the crankcase.

It should be understood that the provision of means for the admission of fresh air to the crankcase is not necessary to the correct operation of the crankcase depression regulator of this invention and, furthermore, that the regulator 24 could, within the scope of this invention, be connected to any suitable point of the engine crankcase or its communicating passages. Also, instead of being connected directly with the inlet manifold, the regulator 24 could equally well be connected with any part of the induction system which is subject to substantially the vacuum present in the inlet manifold and the term inlet manifold as subsequently used in the specification and claims should be broadly construed to indicate any such part of the induction system.

General construction of regulator

Figure 3:
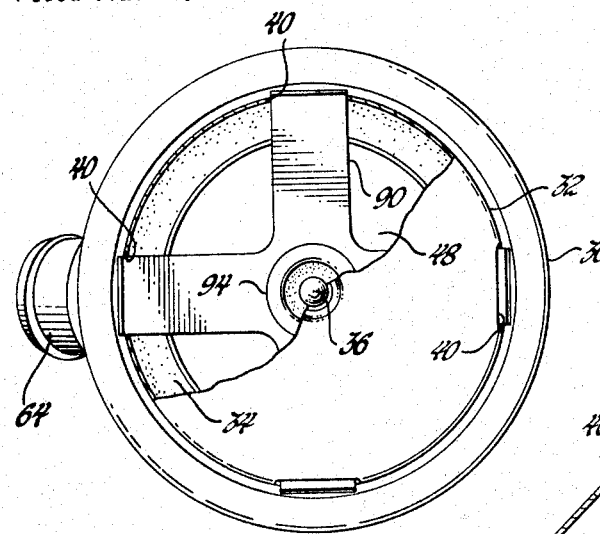
FIGURE 3 is a top view of the crankcase depression regulator of FIGURE 2 partially broken away to show the bimetallic cold starting device.

One embodiment of a crankcase depression regulator according to the invention is shown in FIGURES 2 and 3 and comprises a housing 30 including a cover 32 with a diaphragm generally indicated by numeral 34 sealingly clamped therein around its periphery. Fastening means including rivet 36 and washer 38 engage the center of cover 32, affixing thereto the center of diaphragm 34. Openings 40 are provided in cover 32 allowing the admission of atmospheric pressure against the diaphragm. Diaphragm 34 includes an outer annular convolution 42 adjacent the clamped portion of the periphery and an inner annular convolution 44 adjacent the affixed center of the diaphragm. The annular portion of the diaphragm between the convolutions 42 and 44 carries a valve member generally indicated by numeral 46 and an annular backing member 48 secured on the lower and upper sides respectively of diaphragm 34 by suitable securing means 50. Diaphragm 34 and valve member 46 comprise movable wall means. Such wall means could equally well be formed by suitable valve means sealingly connected between inner and outer flexible portions of any suitable type which could functionally substitute for convolutions 44 and 42 respectively.

Valve member 46 includes an annular flange 52 which engages diaphragm 34 and a preferably cylindrical extension 54 terminating in an annular inwardly flared portion 56 having therein a central opening 58. It should be understood that the extension portion of valve 46 could be made other than cylindrical; for instance, it could have a conical or hemispherical cross-sectional configuration and the opening 58 need not be exactly centered therein. Cylindrical extension 54 and annular portion 56 together with convolution 44 and fastening means 36 and 38 define a balance chamber 60, the purpose for which will be later described.

Housing 30 and diaphragm 34 together define a chamber 62 which is adapted to be communicated with the crankcase of the engine. Such connection may be by inlet means such as connector tube 64 mounted in a wall of housing 30 and adapted to seat in an opening provided in rocker cover 20. Outlet means generally indicated by numeral 66 are also provided in a wall of housing 30 and include an external tubular connecting portion 68 which is adapted to be connected with the engine inlet manifold by means such as conduit 26 (see FIGURE 1).

Outlet means 66 further includes a tubular portion 70 extending into chamber 62 and terminating in a valve seat 72 which is preferably, but not necessarily, of circular configuration. Annular portion 56 of valve 46 is adapted to engage valve seat 72 to close communication between vacuum chamber 62 and outlet means 66. However, resilient means such as coil spring 74 is provided in engagement with housing 30 and valve 46 to bias the valve away from valve seat 72 and normally provide an open path of communication between chamber 62 and outlet means 66.

Operation generally

The operation of the portions of the valve mechanism so far described is as follows. Vacuum in the inlet manifold 14 caused by normal operation of the engine draws vapors from the engine crankcase 12 through connector tube 64, chamber 62 and past valve seat 72 through outlet means 66 and into the inlet manifold 14 to be mixed with the combustible mixture passing therethrough to the engine cylinders. The withdrawal of vapors from the crankcase leaves a reduced pressure therein which is transmitted into chamber 62 and allows atmospheric pressure acting on the upper side of diaphragm 34 opposite chamber 62 to move the diaphragm and the annular portion 56 of valve member 46 in the direction of valve seat 72 against the bias of spring 74 so as to reduce the valve opening and restrict the flow of crankcase vapors therethrough. Upon reaching a point where the difference between atmospheric and crankcase pressures acting on diaphragm 34 create a force equal to the opposing force of spring 74, the movement of the valve will be halted and the flow of crankcase vapors will be stabilized at a rate such that a relatively constant depression will be maintained within the engine crankcase.

Balance chamber

Figure 5:
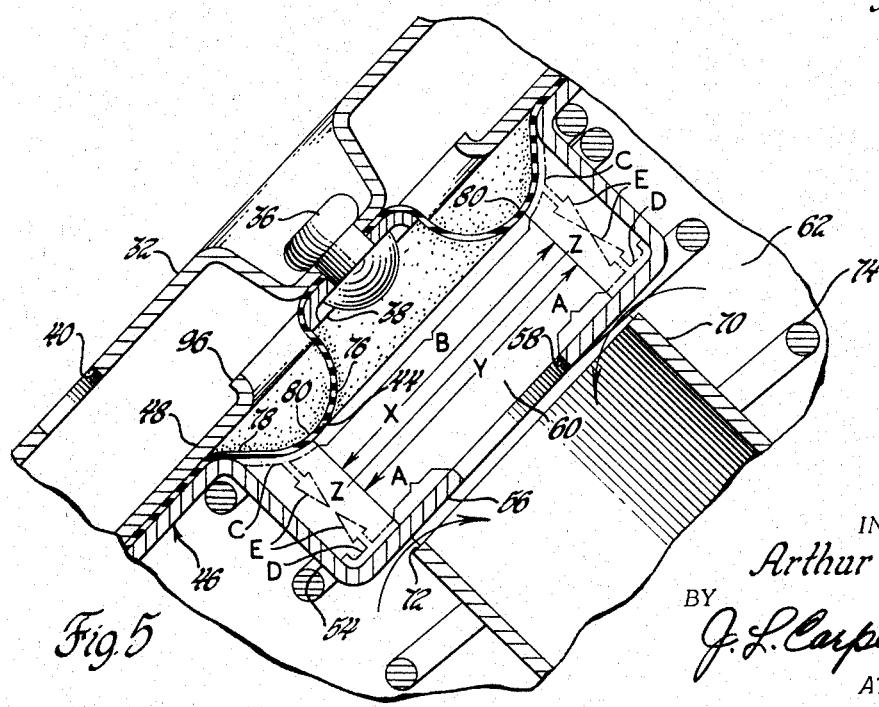
FIGURE 5 is an enlarged cross-sectional view of the balance chamber portion of the embodiment of FIGURE 4 including diagrammatic portions for illustrating the mode of operation of the balance chamber.

If it were not for the balance chamber 60, the operation of which is about to be described, the relationship between atmospheric pressure and the crankcase depression which the valve is designed to maintain would be affected by variations in manifold vacuum, transmitted to the interior of tubular portion 70, which would act on the central portion of the movable valve and diaphragm assembly causing variations in the forces exerted on the valve member in relation to the variations in manifold vacuum. The manner in which the balance chamber 60 is arranged to balance out the effects of manifold vacuum is best shown by FIGURE 5.

It is seen that the area between valve seat 72 and annular portion 56 is a restriction, across which occurs the change in pressure between crankcase depression in chamber 62 and manifold vacuum within tubular portion 70. Consequently, opening 58 in annular flange 56 is effective to transmit manifold vacuum into the balance chamber 60. This vacuum, of course, acts equally on all walls of the balance chamber. The vacuum acting on the inner area A of portion 56, between the line of contact with valve seat 72 and opening 58, is balanced by the occurrence of equal vacuums on each side so that this exerts no force on the movable valve and diaphragm assembly.

The force due to manifold vacuum acting on inner convolution 44 is divided between fixed washer 38 and movable valve 46 so that, we may say in effect, that forces acting on the inner portion 76 of convolution 44 are transferred to and act only upon the fixed washer 38, having no effect upon movable valve 46. Conversely, the forces acting on the outer portion 78 of convolution 44 may be said to be transferred to and act wholly upon movable valve 46. For purposes of the specification and claims, the inner portion 76 is defined as that portion of convolution 44 upon which forces acting may be said to be transferred wholly to fixed washer 38 and the outer portion 78 is defined as that portion of convolution 44 upon which forces acting may be said to be transferred wholly to movable valve 46. For reference purposes, an imaginary line representing the common boundary between the two portions is indicated by numeral 80.

The balance chamber is so dimensioned that boundary line 80 and the line of contact of extension 54 with valve seat 72 define substantially equal areas X and Y, respectively, as projected upon a common reference plane disposed perpendicular to the direction of movement of valve 46. Such a reference plane is indicated by the line Z—Z. Some adjustment in the areas may be required due to the thickness of the line of contact due to the width of valve seat 72. Further, it should be noted that areas X and Y, as projected on plane Z—Z, need not be co-extensive nor need they be in alignment as shown in the figure. The only requirement is that they be substantially equal.

It may be seen that the inner upper surface B of balance chamber 60, co-extensive with area X, comprises inner convolution 76 and affixing means 36, 38 which in total have been previously shown to exert no force on movable valve 46. By the same token, the lower surface of balance chamber 60, co-extensive with area Y, comprises the inner area A of portion 56, which was previously shown to be balanced and thus exerts no force on movable valve 46. As a result, the projected area of the remaining upper surface C and the projected area of remaining lower surface D of the balance chamber, as indicated in FIGURE 5 by broken lines, must be equal to one another. (Note that upper surface C may be greater than the area of outer portion 78 depending on the balance chamber configuration.) Consequently, the effects of manifold vacuum acting on these equal and oppositely disposed areas are completely balanced out as indicated by the arrows E. Thus it should be clear that there are no unbalanced forces caused by manifold vacuum acting on any part of the movable valve and diaphragm assembly and that the effect of the balance chamber is to completely eliminate manifold vacuum as a factor in the operation of the crankcase depression regulator.

It should be understood that numerous changes may be made in the configuration of the balance chamber without changing its essential mode of operation; for instance, the outer diameter of convolution 44 may be made smaller than the cylindrical wall of extension 54 or the shape of cylindrical wall of extension 54 may be made non-cylindrical or non-regular in shape as long as provision is made for the free movement of convolution 44. For balanced operation, however, the projected area X, must be substantially equal to the projected area Y.

Modification for unbalanced operation

It should be pointed out that the above-described construction may be modified so as to be partly responsive to the effect of manifold vacuum merely by changing the relative sizes of areas X and Y; for instance, if area X is made smaller than area Y, the remaining upper surface C of the balance chamber will be greater than the remaining lower surface D. Consequently, manifold vacuum acting on these areas will result in an unbalanced force urging valve 46 toward valve seat 72. To the contrary, if area X is made larger than Y, the remaining upper surface C of the balance chamber will be smaller than the remaining lower surface D resulting in a force due to the unbalanced manifold vacuum urging valve 46 away from valve seat 72. It should be clear that such changes in the relationships of areas X and Y might be made in many ways, such as, for instance, changing the size or shape of tubular portion 70 so as to alter the size of area Y, or changing the size of the inner or outer diameters of convolution 44 so as to alter the size of area X. The manner in which the change in the relationship of areas X and Y is made is unimportant. What is important is the resulting relationship between these areas.

Although the balance chamber feature, as heretofore described, has been disclosed in a specific embodiment in conjunction with a crankcase depression regulator, it should be understood that this feature is broadly applicable to suitably constructed diaphragm type pressure regulators used for other purposes as well and the disclosure should be so construed.

Reverse flow prevention feature

In order to prevent the flow of crankcase vapors from the inlet manifold to the engine crankcase, outlet means 66 is provided with an enlarged central portion 82 having an annular valve seat 84 at the upstream end thereof and retaining therein, by means such as wire retainer 86, a ball check valve 88. In case of an engine backfire causing pressure in the inlet manifold, the ball check valve 88 will be forced against annular seat 84 closing the passage and preventing the reverse flow of gases from the inlet manifold to the engine crankcase, thus eliminating any possibility of a crankcase explosion due to the backfire.

Cold starting feature

With a valve construction as heretofore described, it has been found that difficulty in starting a cold engine is experienced since the passage for the flow of crankcase vapors is completely open under engine starting conditions preventing the proper operation of the choke mechanism. In order to overcome these problems, it is desirable that means be provided to close the flow passage through the valve under cold engine starting conditions. In the embodiment of FIGURES 2 and 3, this is accomplished by the provision of temperature responsive means including a bimetallic spring 90 having radially extending arms engaging openings 40 provided at the periphery of cover 32. At the center of bimetallic spring 90, an opening 92 is provided carrying a grommet 94. When the engine is cold, grommet 94 is biased by spring 90 into engagement with an upturned flange 96 at the inner edge of backing member 48 thereby forcing valve member 46 into the closed position against the bias of spring 74.

However, if a pressure should develop in the engine crankcase due, for instance, to blow-by past the cylinders, it will be transmitted into chamber 62 and act against diaphragm 34 to open valve 46 against the bias of bimetallic spring 90 sufficiently to relieve any excess crankcase pressure. In addition, as its temperature increases, the bias of bimetallic spring 90 is reduced until, at a predetermined point below normal operating temperature, the spring moves away from engagement with flange 96 and has no further effect upon operation of valve 46 until such time as the engine is stopped and its temperature is substantially reduced.

In this manner the bimetallic spring 90 is effective to close valve 46 only during cold engine starting and running conditions, but has no effect when the engine is sufficiently warmed up. In addition, provision is made for relief of excessive crankcase pressures under all operating conditions.

Figure 4:
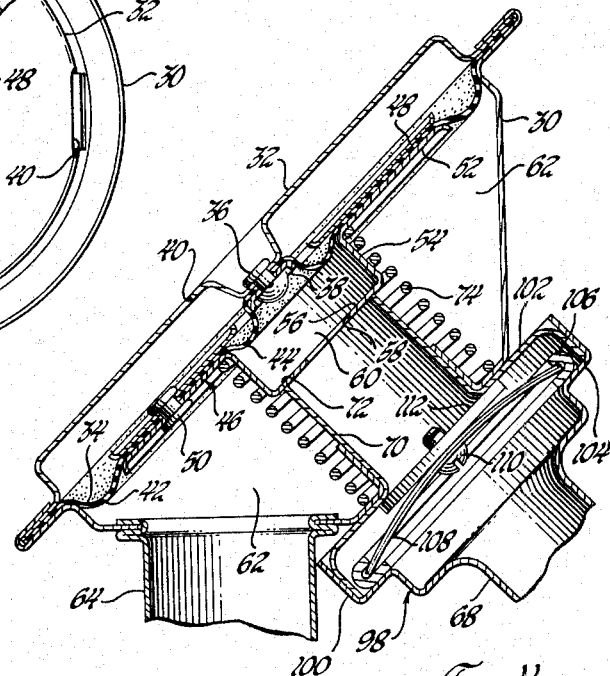
FIGURE 4 is a cross-sectional view of an alternative embodiment of a crankcase depression regulator according to the invention.

Embodiment of FIGURE 4

In the alternative embodiment shown in FIGURE 4, the construction and operation of the valve housing and diaphragm arrangement including the balance chamber are identical to those of the embodiment shown in FIGURE 2 and identical numerals are used to identify corresponding parts. The difference in the embodiment of FIGURE 4 lies in the removal of the temperature responsive bimetallic spring feature from the cover portion of the valve and the provision of a similar feature in combination with check valve means for prevention of reverse flow due to a backfire.

In this embodiment outlet means generally indicated by numeral 98 incorporates an enlarged central portion 100 having upper and lower radial shoulder portions 102 and 104, respectively. Contained within enlarged portion 100 is an annular retainer 106 of generally U-shaped cross section loosely retaining the ends of the radially extending legs of a bimetallic spring 108. At its center, bimetallic spring 108 is connected by fastening means 110 to a disc-shaped check valve 112 which, under cold engine conditions, is biased into engagement with upper shoulder 102 so as to close the passage to the flow of crankcase vapors.

In this condition, pressure developing in the crankcase will act upon the upper surface of disc valve 112 so that excessive pressures may be relieved by overcoming the bias of spring 108, opening the valve, and allowing flow from the crankcase into the inlet manifold. In addition, as its temperature increases, the tension of bimetallic spring 108 is lessened until at a predetermined temperature, spring 108 attains a relatively flat configuration, thereby permitting disc valve 112 to move away from its seat and allowing the free passage of crankcase vapors through outlet means 98. Even in this condition, however, should a backfire occur, causing pressure in the inlet manifold, this pressure will force disc valve 112 upwardly into engagement with shoulder 102, again closing the passage and preventing any reverse flow of vapors into the engine crankcase.

The use of the terms upper and lower in the specification is intended merely to designate the relative positions of parts within the described regulator embodiments and is not intended to indicate that the regulator is limited to installation in any particular position.

It is apparent that other modifications of the invention disclosed herein could be made without departing from its spirit and scope which is to be limited only by the language of the appended claims.

What is claimed is:

1. A valve assembly for regulating the flow of fluids between the crankcase and the induction system of an internal combustion engine and comprising:
    means defining a fluid conducting passage extending through the valve assembly;
    a single valve seat past which substantially all fluid flow through the passage means must pass, said seat being disposed in the passage means and separating the passage means into first and second portions, adapted to be connected to such crankcase and such induction system respectively;
    a balanced valve in the passage and adapted to be moved linearly into and out of contact with the valve seat whereby to close or open the passage to fluid flow therethrough, said valve being substantially unaffected by induction system pressures in the second portion and to which it is exposed;
    and movable wall means carrying said valve and adapted to control the linear movement thereof, said wall means being responsive to crankcase pressure in the first portion of the passage means whereby to move the valve in an opening direction upon increasing crankcase pressure and to move the valve in a closing direction upon decreasing crankcase pressure.

2. A valve assembly as defined in claim 1 and further comprising a check valve in the passage and adapted to close in response to excessive pressure in the induction system whereby to substantially prevent the reverse flow of fluids from the second portion to the first portion.

3. The device of claim 2 wherein is included temperature responsive means in the valve assembly and adapted under predetermined low temperature conditions to bias one of said valves to a normally closed position whereby to close the passage to normal fluid flow except under conditions of excessive pressure in the first portion and further responsive upon an increase in temperature to normal operating conditions to remove the bias and allow resumption of normal fluid flow.

4. In a pressure regulator of the type having a valve seat and valve means adapted to move into and out of non-sliding engagement with such valve seat to regulate fluid flow between first and second pressure sources, the improvement comprising:
    balance chamber means partially formed by such valve means and in constant communication with such second pressure source, said balance chamber means including;
    flexible wall means having a central portion surrounded by a movable portion;
    limit means to limit movement of said central portion;
    and an extending valve portion carried by the movable portion and adapted to contact such valve seat whereby to cut off fluid flow therethrough between such first and second pressure sources;
    said valve seat, said flexible wall means and said extending valve portion being proportioned such that pressures from such second pressure source acting on the valve means are substantially balanced out.

5. A pressure regulator adapted to be connected between a first fluid pressure source and a second fluid pressure source and operable to regulate fluid flow therebetween in response to the pressure differential between such first pressure and a reference pressure, said regulator comprising:
    a housing;
    movable wall means retained by said housing and having inner and outer flexible portions, the periphery of said outer flexible portion being sealingly affixed with respect to said housing;
    limit means to limit movement of the center of said inner flexible portion with respect to said housing;
    said movable wall means and said housing at least partially defining a first chamber adapted to be communicated with such first pressure source, said movable wall means having one surface adapted to be exposed to such first pressure in said first chamber and having an opposite surface adapted to be exposed to such reference pressure;
    outlet means in a wall of said regulator and adapted to be communicated with such second pressure source;
    valve seat means in said regulator and fixed with respect to said housing;
    and valve means movable with and sealingly carried by said inner and outer flexible portions of said movable wall means, said valve means including an extending portion adapted to be moved into and out of contact with said valve seat and having an opening completely within the line of contact of said extending portion with said valve seat;
    said inner flexible portion and said extending portion at least partially defining a balance chamber in constant communication with said outlet means, movement of said valve into contact with said valve seat being effective to cut off fluid flow therethrough between said first chamber and said outlet means.

6. A pressure regulator as defined in claim 5, wherein said inner flexible portion has inner and outer portions defining a common boundary, said boundary and the line of contact of said extending portion with said valve seat defining substantially equal areas as projected on a reference plane disposed perpendicular to the direction of movement of said valve means whereby the effect of said second pressure on the movement of said valve means is completely balanced out.

7. For use in combination with an internal combustion engine having a crankcase and an inlet manifold, a crankcase depression regulator, adapted to be connected between such crankcase and such inlet manifold to regulate the flow of crankcase vapors therebetween and comprising:
    a housing;
    movable wall means retained by said housing and having inner and outer flexible portions, the periphery of said outer flexible portion being sealingly affixed with respect to said housing;
    limit means to limit movement of the center of said inner flexible portion with respect to said housing;
    said movable wall means and said housing at least partially defining a first chamber adapted to be communicated with such crankcase, said movable wall means having one surface adapted to be exposed to crankcase pressure in said first chamber and having an opposite surface adapted to be exposed to atmospheric pressure;
    outlet means in a wall of said regulator and adapted to be communicated with such inlet manifold;
    valve seat means in said regulator and fixed with respect to said housing;
    valve means movable with and sealingly carried by said inner and outer flexible portions of said movable wall means, said valve means including an extending portion adapted to be moved into and out of contact with said valve seat and having an opening completely within the line of contact of said extending portion with said valve seat, said inner flexible portion and said extending portion at least partially defining a balance chamber in constant communication with said outlet means;

and resilient means in said regulator and biasing said valve means in an opening direction away from said valve seat;

said valve means being movable by atmospheric pressure in response to a predeterminated crankcase depression to move against the bias of said resilient means and toward said valve seat whereby to regulate the flow of crankcase vapors from such crankcase to such inlet manifold, movement of said valve means into contact with said valve seal being effective to cut off fluid flow therethrough between said first chamber and said outlet means.

8. A crankcase depression regulator as defined in claim 7 wherein said inner flexible portion has inner and outer portions defining a common boundary, said boundary and the line of contact of said extending portion with said valve seat defining substantially equal areas as projected on a reference plane disposed perpendicular to the direction of movement of said valve means, whereby the effect of manifold vacuum on the movement of said valve means is completely balanced out.

9. A crankcase depression regulator as defined in claim 7 and further comprising:

temperature responsive biassing means tending to close communication between such crankcase and such inlet manifold when the temperature of said regulator is relatively cold and responsive to an increase in operating temperature above a predetermined amount to cancel the tendency to close such communication, said biasing means being adapted to yield in response to a predetermined positive pressure in such crankcase to allow the relief of such positive pressure by permitting a sufficient fluid flow for this purpose from such crankcase to such inlet manifold;

and pressure responsive means in said outlet means and adapted to allow unrestricted flow of fluids from such crankcase to such inlet manifold but to close in response to pressure in such inlet manifold so as to prevent a substantial flow from such inlet manifold to such crankcase.

10. A crankcase depression regulator as defined in claim 9 wherein said inner flexible portion has inner and outer portions defining a common boundary, said boundary and the line of contact of said extending portion with said valve seat defining substantially equal areas as projected on a reference plane disposed perpendicular to the direction of movement of said valve means, whereby the effect of manifold vacuum on the movement of said valve means is completely balanced out.

11. For use in combination with an internal combustion engine having a crankcase and an inlet manifold, a crankcase depression regulator, adapted to be connected between such crankcase and such inlet manifold to regulate the flow of crankcase vapors therebetween and comprising:

a housing retaining movable diaphragm means having inner and outer convolutions, the periphery of said outer convolution being sealingly affixed with respect to said housing;

limit means to limit movement of the center of said inner convolution with respect to said housing;

said diaphragm means and said housing at least partially defining a first chamber adapted to be communicated with such crankcase, said diaphragm means having one surface exposed to crankcase pressure in said first chamber and having an opposite surface exposed to atmospheric pressure;

outlet means in a wall of said first chamber and adapted to be communicated with such inlet manifold, said outlet means including a portion extending within said first chamber and terminating in a valve seat;

valve means movable with and sealingly engaging said diaphragm means between said inner and said outer convolutions and including an extending portion adapted to be moved into and out of contact with said valve seat to regulate communication between said chamber and said outlet means, said inner convolution of said diaphragm means and said extending portion at least partially defining a balance chamber, said extending portion having an opening adapted to communicate said balance chamber with said outlet means;

and coil spring means between said housing and said valve means and biasing said valve means in an opening direction away from said valve seat;

said diaphragm means being movable by atmospheric pressure in response to a predetermined crankcase depression to move against the bias of said coil spring means and toward said valve seat to regulate the flow of crankcase vapors from such crankcase to such inlet manifold.

12. In a crankcase depression regulator, adapted to be connected between the crankcase and the inlet manifold of an internal combustion engine to regulate the flow of crankcase vapors therebetween, and of the type having a diaphragm actuated regulating valve movable in a closing direction in response to increasing crankcase vacuum and resilient means biasing such regulating valve in an opening direction, the improvement comprising temperature responsive valve actuating means including a bimetallic spring disposed within said regulator, said spring being relaxed at normal operating temperatures, but being responsive to temperatures below a predetermined value to bias such valve in a closing direction.

13. In a crankcase depression regulator, adapted to be connected between the crankcase and the inlet manifold of an internal combustion engine to regulate the flow of crankcase vapors therebetween, and of the type having a diaphragm actuated regulating valve movable in a closing direction in response to increasing crankcase vacuum, resilient means biasing such regulating valve in an opening direction and a check valve permitting substantial flow through such regulating valve only in the direction from such crankcase to such inlet manifold, the improvement comprising temperature responsive valve actuating means including a bimetallic spring disposed within said regulator, said spring being relaxed at normal operating temperatures but being responsive to temperatures below a predetermined valve to bias one of such valves in a closing direction, said bimetallic spring being adapted to yield in response to excessive crankcase pressures to allow such pressures to be relieved through said one of such valves.

14. In an internal combustion engine of the type having a crankcase and an inlet manifold, crankcase pressure regulating means comprising:

conduit means communicating such crankcase with such inlet manifold;

a crankcase pressure regulator connecting with said conduit means and operable to regulate fluid flow therethrough;

said regulator including a housing;

movable wall means retained by said housing and having inner and outer flexible portions, the periphery of said outer portion being sealingly affixed with respect to said housing;

limit means to limit movement of the center of said inner flexible portion with respect to said housing;

said movable wall means and said housing at least partially defining a first chamber adapted to be communicated with such crankcase, said movable wall means having one surface exposed to crankcase pressure in said first chamber and having an opposite surface exposed to atmospheric pressure;

outlet means in a wall of said regulator and adapted to communicate with such inlet manifold;

valve seat means in said regulator and fixed with respect to said housing;

and valve means movable with and sealingly carried by said inner and outer flexible portions of said movable wall means, said valve means including an extending portion adapted to be moved into and out of contact with said valve seat and having an opening completely within the line of contact of said extending portion with said valve seat;

said inner flexible portion and said extending portion at least partially defining a balance chamber in constant communication with said outlet means, movement of said valve into contact with said valve seat being effective to cut off fluid flow therethrough between said first chamber and said outlet means.

15. In an internal combustion engine of the type having a crankcase and an inlet manifold, crankcase ventilation means comprising:

fresh air inlet means on such engine and communicating with such crankcase, said fresh air inlet means including a restricted passage for limiting the flow of fresh air into such crankcase;

conduit means communicating such crankcase with such inlet manifold;

a crankcase depression regulator connecting with said conduit means and operable to regulate fluid flow therethrough;

said regulator including a housing;

movable wall means retained by said housing and having inner and outer flexible portions, the periphery of said outer flexible portion being sealingly affixed with respect to said housing;

limit means to limit movement of the center of said inner flexible portion with respect to said housing;

said movable wall means and said housing at least partially defining a first chamber adapted to be communicated with such crankcase, said movable wall means having one surface exposed to crankcase pressure in said first chamber and having an opposite surface exposed to atmospheric pressure;

outlet means in a wall of said regulator and adapted to be communicated with such inlet manifold;

valve seat means in said regulator and fixed with respect to said housing;

valve means movable with and sealingly carried by said inner and outer flexible portions of said movable wall means, said valve means including an extending portion adapted to be moved into and out of contact with said valve seat and having an opening completely within the line of contact of said extending portion with said valve seat;

and resilient means in said housing and biasing said valve means in an opening direction away from said valve seat;

said inner flexible portion and said extending portion at least partially defining a balance chamber in constant communication with said outlet means, movement of said valve into contact with said valve seat being effective to cut off fluid flow therethrough between said first chamber and said outlet means;

said inner flexible portion having inner and outer portions defining a common boundary, said boundary and the line of contact of said extending portion with said valve seat defining substantially equal areas as projected on a reference plane disposed perpendicular to the direction of movement of said valve means, whereby the effect of inlet manifold vacuum on the movement of said valve means is completely balanced out.

16. A pressure regulator for regulating fluid flow and comprising:

means defining a fluid conducting passage through the regulator;

a single valve seat past which substantially all fluid flow through the passage means must pass, said seat being disposed in the passage means and separating the passage means into first and second portions;

a balanced valve in the passage and adapted to be moved linearly into and out of contact with the valve seat whereby to close or open the passage to fluid flow therethrough, said valve being substantially unaffected by fluid pressures in the second portion to which it is exposed;

and movable wall means carrying said valve and adapted to control the linear movement thereof, said wall means being responsive to fluid pressure in the first portion of the passage means whereby to move the valve in an opening direction upon increasing pressure in said first portion and to move the valve in a closing direction upon decreasing pressure in said first portion.

17. A pressure regulator for controlling fluid flow and comprising;

means defining a fluid conducting passage through the regulator;

valve means in the passage means and separating the passage means into first and second portions, said valve means comprising;

a single stationary valve seat past which substantially all flow through the passage means must pass;

and single control means responsive to fluid pressure in said first portion to move linearly toward and away from contact with said valve seat, said control means cooperating with said valve seat and constituting the sole means to control fluid flow through said passage, said control means being exposed to fluid pressure in said second portion but being substantially unaffected thereby.

References Cited by the Examiner

UNITED STATES PATENTS

| | | | |
|---|---|---|---|
| 3,035,608 | 5/1962 | Ray | 137—505.18 X |
| 3,108,581 | 10/1963 | Humphreys | 123—119 |
| 3,145,697 | 8/1964 | Barr | 123—119 |
| 3,182,647 | 5/1965 | Bintz | 123—119 |

KARL J. ALBRECHT, *Primary Examiner.*

UNITED STATES PATENT OFFICE
CERTIFICATE OF CORRECTION

Patent No. 3,263,660                                                    August 2, 1966

Arthur P. S. Hyde

It is hereby certified that error appears in the above numbered patent requiring correction and that the said Letters Patent should read as corrected below.

Column 9, line 7, for "predeterminated" read -- predetermined --; line 12, for "seal" read -- seat --; line 26, for "biassing" read -- biasing --; column 10, line 46, for "valve" first occurrence, read -- value --.

Signed and sealed this 1st day of August 1967.

(SEAL)
Attest:

EDWARD M. FLETCHER, JR.                                  EDWARD J. BRENNER
Attesting Officer                                                         Commissioner of Patents